Patented Aug. 1, 1939

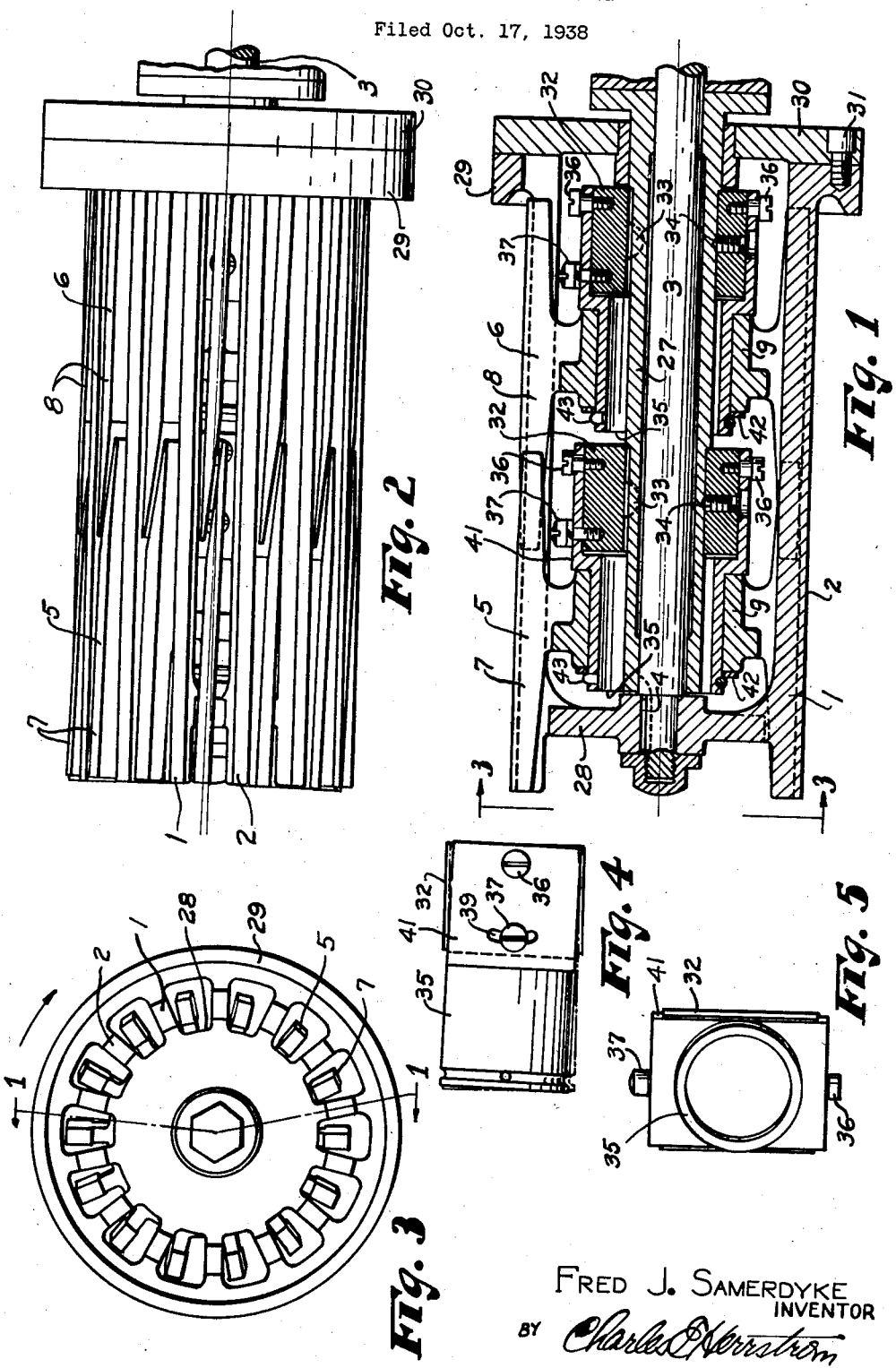

2,167,681

UNITED STATES PATENT OFFICE 2,167,681

CANTILEVER WINDING REEL

Fred J. Samerdyke, Rocky River, Ohio, assignor to Industrial Rayon Corporation, Cleveland, Ohio, a corporation of Delaware Application October 17, 1938, Serial No. 235,326

11 Claims. (Cl. 242—53)

This invention concerns a novel winding reel of cantilever form.

More particularly, the invention relates to a winding reel comprising a set of spaced, longitudinally extending bar members which is substantially circular in cross section between the bar members of which are disposed the bar members of another substantially circular set of spaced, longitudinally extending bar members. In winding reels of the kind to which the invention relates, the sets of bar members are in inclined relation to each other and so mounted that, during rotation, material such as thread, filaments, ribbon or the like wound about the two sets are transferred alternately from one set of bar members to the other. In consequence of the inclined relation between the sets of bar members, the thread or the like is caused to advance longitudinally of the reel.

Winding reels operating on this principle are shown, described and claimed in a prior application of Walter F. Knebusch entitled "Winding reel", Serial No. 652,089, filed January 16, 1933. The reel illustrated in said application consists of two wholly rigid reel members which are generally circular in cross section. The periphery of each reel member is made up of a plurality of spaced, longitudinally extending bar members. The bar members of the two reel members interdigitate, those of one reel member alternating with those of the other. The reel members are rotatably mounted about axes which are offset from and inclined to each other, but so disposed that the axis of each reel member is contained within the cylindrical boundary of the other reel member. The offset and inclined relation of the reel members causes thread, filaments, ribbon or the like wound on the reel to advance longitudinally of the reel in the form of closely spaced, generally helical turns.

In reels of this kind the length of a given reel is limited by possible interference between adjacent bar members. Such interference occurs if the bar members exceed a length dependent, among other things, upon the amount of inclination, the spacing between the bar members, and the number of bar members in each set. On one hand, it is desirable that the bar members be as close together and their number as large as reasonably possible, since a periphery is thereby obtained which is more nearly circular and the thread or the like is supported at a greater number of points. On the other hand, a relatively large number of closely spaced bar members increases the possibility of interference between the bar members. The present invention seeks, among other things, to minimize the difficulties introduced by these conflicting desiderata.

Interference between adjacent bar members may be obviated, particularly in long reels, by using in lieu of one of the two sets of longitudinally extending bar members ordinarily employed a plurality of opposed sets of longitudinally extending bar members each of which is short in relation to the overall length of the reel. The short sets of bar members are so mounted that the individual pairs of opposed bar members thereof are disposed between the bar members of the conventional set of bar members, which may extend in the usual way for substantially the full length of the reel. The relatively short sets of bar members are mounted in canted relation to the relatively long set of bar members. The bar members of the opposed relatively short sets of bar members are not long enough to cause interference, yet taken together suffice to cause advance of the thread or the like from one end of the reel to the other.

No claim is made herein to the features of construction described in the preceding paragraph, which are shown, described and broadly claimed in Lovett application Serial No. 76,966, filed April 29, 1936.

The present invention provides a reel of this kind which is of cantilever form. It makes it possible to leave one end of the reel unobstructed by supporting means for the reel, whereby great advantages in the operation of the reel and in the manipulation of the thread or the like ar provided. The present invention also provides means for adjusting thread-advancing reels which means may be advantageously employed in reels of the types above indicated, whether they embody two or more sets of bar members.

In the drawing, in which is shown one form of reel embodying the invention, Figure 1 is a longitudinal sectional elevation of the reel from line 1—1 of Figure 3. Figure 2 is a plan elevation of said reel. Figure 3 is an end elevation of said reel from line 3—3 of Figure 1. Figure 4 is a plan elevation of one means which may be provided for adjusting the inclined relationship of the reel members of the reel of Figures 1, 2 and 3. Figure 5 is an end elevation of the device of Figure 4. In the drawing, like reference numerals refer to like parts throughout.

The reel shown in Figures 1, 2 and 3 embraces a rigid reel member 1 which is substantially circular in cross section. The periphery of such reel member comprises a plurality of spaced, longitudinally extending relatively long bar members 2 mounted concentrically about and for rotation with a drive shaft 3, as by a key 4. In the illustrated embodiment of the invention, two rigid, eccentric reel members 5 and 6, each of which is substantially circular in cross section and the respective peripheries of which comprise spaced, longitudinally extending relatively short bar members 7 and 8, are rotatably mounted in end-to-end relation about independent axes each of which is offset from and inclined to the axis of concentric reel member 1.

The bar members of eccentric reel members 7 and 8 are short enough, taking into account the number of bar members, the spacing of the bar members, and the amount of inclination, to obviate interference with the bar members 2 of concentric reel member 1. In order to insure advance of the thread or the like in the same direction throughout the length of the reel, the axes of eccentric reel members 5 and 6 are inclined in the same direction and are preferably disposed in a common plane offset slightly from and parallel to the axis of concentric reel member 1, as shown in Figures 1 and 2. If a uniform advance of the thread or the like throughout the length of the reel is desired, the axes of the eccentric reel members should preferably, but otherwise need not, be parallel to each other. Eccentric reel members 5 and 6 and concentric reel member 1 are therefore closely associated in the sense that they occupy and rotate in substantially the same space.

The effect of mounting eccentric reel members 5 and 6 about independent axes each canted to that of concentric reel member 1 is apparent from Figure 2. As can be seen therefrom, bar members 7 and 8 of eccentric reel members 5 and 6 are in a sense in offset relation to each other. Since bar members 7 and 8 are relatively short, there is no interference between them and bar members 2 of concentric reel member 1. The reel, however, may be as long as desired, so long as there is provided a suitable number of relatively short eccentric reel members each disposed about an axis canted to that of the concentric reel member 1.

Adjacent ends of the bar members 7 and 8 of opposed eccentric reel members 5 and 6 should preferably be adapted to provide continuous support for the thread or the like wound on the reel and being advanced longitudinally thereof. For this purpose, bar members 7 and 8 may overlap as shown, the contiguous sides of bar members 7 and 8, respectively, being tapered to prevent interference therebetween. Furthermore, the thread-supporting surfaces of the overlapping portions of bar members 7 and 8 are preferably gradually tapered as indicated to allow the thread or the like as it travels longitudinally of the reel to be transferred gradually from the bar members of one eccentric reel member to those of the other.

In the illustrated reel, the eccentric reel members 5 and 6 are adjustably supported on a projecting frame member 27 which is supported from one end only and extends for a substantial length of the reel.

Drive shaft 3 is journalled in said frame, a portion of said drive shaft projecting from the free end of said frame member. Concentric reel member 1 is mounted on and driven from said projecting end of drive shaft 3, the other end of concentric reel member 1 being journalled on frame member 27 concentrically about the axis of rotation of drive shaft 3. Concentric reel member 1 illustrated in Figures 1, 2 and 3 embodies a spider 28 at the driven end of member 1 on which spider are mounted the bar members 2 of concentric reel member 1. Bar members 2 are supported at the other end of concentric reel member 1 by an exterior ringlike portion 29 which is fastened to an annular supporting member 30 as by bolts 31, member 30 being rotatably supported on frame member 27. The exterior ringlike portion 29 may serve to reinforce the bar members as well as to guide thread onto the reel.

Each of the short eccentric reel members 5 and 6 in the illustrated embodiment of the invention is disposed within the periphery defined by the bar members 2 of concentric member 1. Said reel members 5 and 6 are mounted in end-to-end relation on longitudinally extending frame member 27 for rotation about axes which are inclined to and offset from the axis of reel member 1 in the desired relationship. The bar members 7 and 8 of the reel members 5 and 6 overlap and are tapered as above described. The bar members of each reel member 5 and 6 in the reel shown are formed integrally with a hub portion 9 which is provided with a bore therethrough concentrically of the reel member by means of which said reel member is journalled on the inclined bushing 35 carried by the longitudinally extending frame member 27.

The reel illustrated as embodying the invention is of cantilever construction; that is, it is supported and driven from one end only. The other end is free of any obstruction impeding the discharge of thread or the like or the winding of the thread or the like over such end. Reels of cantilever construction may be very advantageously employed for various uses, as in the continuous processing of thread or the like. The free end of the reel provides advantages in starting the thread or the like on the reel in the threading up operation, as well as numerous other advantages in providing ease of accessibility to the reel for manipulation of the thread or the like thereon, inspection, repair, etc. Such advantages are furthered when the reel is so constructed and arranged that the thread or the like is advanced toward the free end of the reel.

In operation, concentric reel member 1 is rotated by means of shaft 3. Eccentric reel members 5 and 6 are driven by contact of their bar members 7 and 8 with the bar members 2 of concentric reel member 1. As shown in Figure 3, the displacement of the axes of eccentric reel members 5 and 6 laterally of the axis of concentric reel member 1 causes the bar members 7 and 8 of these reel members to project outward beyond the bar members 2 of concentric reel member 1 during part of a complete revolution of the reel and bar members 2 of concentric reel member 1 to project outward beyond those of eccentric reel members 5 and 6 through the other part of the revolution. Thread or the like wound on the reel is thus transferred during rotation of the reel from the bar members of concentric reel member 1 to the bar members of one or the other of eccentric reel members 5 and 6, depending on the position of the particular turn of the thread or the like on the reel.

The inclined relation of eccentric reel members 5 and 6 with respect to concentric reel member 1 produces bodily advance of the portions of the thread or the like which are carried by them during that portion of the revolution of the reel during which their bar members support the thread or the like. It will be understood that, for a given direction of rotation of the reel and for a given direction of lateral displacement of the axes of eccentric reel members 5 and 6, the turns of thread or the like will move in a direction along the reel determined by the direction of inclination of the axes of eccentric reel members 5 and 6 with respect to the axis of concentric reel member 1. It is obvious that the general direction of inclination of eccentric reel members 5 and 6 should be the same if an advance of the thread or the like in the same direction along the entire length of the reel is desired; further, as the inclined relation is modified, that the pitch of the generally helical turns of thread or the like is modified.

In this embodiment of the invention, for the direction of rotation indicated by the arrow in Figure 3, the thread or the like will advance along the reel from right to left in Figures 1 and 2. As previously indicated, a longitudinally continuous support for the turns of thread or the like is provided by contiguous tapered portions of ends of bar members 7 and 8 of the eccentric reel members 5 and 6. The net effect is to cause thread or the like to be wound turn after turn around the reel in substantially helical form, the succession of turns meanwhile advancing bodily toward the free end of the reel. In this manner, thread or the like led to the reel can be stored upon it in the form of a large number of closely spaced turns, as many as several hundred, depending upon the length of the reel. This capability of continuously but temporarily storing a relatively long length of thread or the like in a small space lends itself advantageously to the employment of such reels in the continuous processing of thread or the like.

The short, eccentric members 5 and 6 may, if desired, be so mounted that the inclined relation of one or more of them may be modified, thus permitting the lead or pitch of the turns of the thread being advanced on the reel to be varied. For instance, one or more of the eccentric reel members 5 and 6 of said reel may be supported by an adjustable mounting, as is each of the eccentric reel members 5 and 6 of the reel shown in Figures 1, 2 and 3. As shown in Figures 1, 4 and 5, in the illustrated embodiment the adjusting means for each eccentric reel member 5 and 6 comprises a supporting member 32 which is demountably disposed on frame member 27 as by a key 33 and set screw 34.

The supporting member 32 may be so formed that it provides the desired offset relationship for the eccentric reel member carried thereby. The bushing 35, on which the corresponding eccentric reel member 5 or 6 is rotatably mounted, is pivotally mounted on supporting member 32, as by cap screw 36. Cap screw 37, which is threaded into supporting member 32 and which is disposed in a suitably formed slot 39 in the supporting bracket 41 for bushing 35, permits angular adjustment of the bushing 35 in one plane as indicated in Figure 4. The reel members 5 and 6 are maintained in proper relationship on the bushing members 35 by means of washers 42 held in place by spring clips 43.

In the apparatus shown, the inclination of the axis of each eccentric member may thus be adjusted by moving said axis in a plane which is parallel to the axis of the concentric member. This may be accomplished by inserting a suitable tool, such as a screw driver, between the bar members of the reel, loosening the cap screw 37 for the reel member 5 or 6 to be adjusted, moving said re member to the desired inclination, and tightening said cap screw. Because the axis of each eccentric member is adjustable in a plane, very accurate adjustment of the pitch of the turns of thread or the like may be obtained.

It is obvious that the amount of inclination for both eccentric reel members 5 and 6 may be made the same, in which case the pitch of the turns of thread or the like will be the same along the entire length of the reel; also, that the degree of inclination may be different for the eccentric reel members 5 and 6, in which case the pitch of the turns of thread or the like will be different at different parts of the reel. This may be advantageous in cases where more than one processing treatment is applied to the thread or the like at intervals along the reel, since it may be desired to subject the thread to a given processing treatment for a longer period than to others.

It is obvious that more than two eccentric reel members may be provided for the reel; for example, in the reel of Figures 1, 2 and 3 more than two eccentric reel members may be mounted on frame member 27. It will be understood that the relation of the concentric and eccentric reel members may be reversed, so that in the apparatus of Figures 1, 2 and 3 the reel member 1 rather than reel members 5 and 6 may be eccentric to the axis of the reel as a whole. The adjusting means discussed above may be employed in connection with other types of reels such, for instance, as those in which only two substantially circular reel members are employed. In the appended claims, the term "thread or the like" is intended to include all materials capable of being wound on and being advanced by reels of the kind to which the present invention pertains.

It is intended that the patent shall cover, by suitable expression in the appended claims, whatever features of patentable novelty reside in the invention.

What is claimed is:

1. A thread-advancing reel of cantilever form comprising a frame member supported from one end only and extending longitudinally of the reel for a substantial length thereof; a reel member rotatably mounted about said frame member embodying a plurality of circumferentially spaced, longitudinally extending bar members; and a plurality of reel members, each embodying a plurality of circumferentially spaced, longitudinally extending bar members alternating with the bar members of said first-mentioned reel member, rotatably mounted on said frame member in end-to-end relation about axes which are mutually non-coincident and are inclined to the axis of said first-mentioned reel member, whereby during rotation of said reel members about their respective axes thread or the like wound about said reel will be advanced lengthwise of the reel from the supported to the unsupported end thereof.

2. A reel according to claim 1 in which all said reel members are formed as rigid units.

3. A reel according to claim 1 in which the bar members of said reel members disposed in end-to-end relation overlap.

4. A thread-advancing reel of cantilever form comprising a stationary projecting frame member supported from one end only; a rigid, cage-like reel member of substantially circular cross section rotatably carried by said frame member, said reel member embodying a set of circumferentially spaced, longitudinally extending bar members and a plurality of spaced supporting members to which said bar members are rigidly fixed and by which said reel member is rotatably supported from said frame member; a reel member of substantially circular cross section embodying a set of circumferentially spaced, longitudinally extending bar members rotatably carried by said frame member between said spaced supporting members for rotation about an axis inclined to that of said first-mentioned reel member, the bar members of said last-mentioned reel member being disposed alternately to those of said first-mentioned reel member.

5. A thread-advancing reel of cantilever form comprising a stationary frame member supported from one end only; a projecting shaft journalled in said frame member; a rigid, cagelike reel member of substantially circular cross section embodying a set of circumferentially spaced, longitudinally extending bar members and a plurality of spaced supporting members to which said bar members are rigidly fixed, one of said supporting members being connected to the projecting end of said shaft and the other being journalled on said frame member; and a rigid reel member of substantially circular cross section embodying a set of circumferentially spaced bar members mounted on said frame member between said supporting members for rotation about an axis inclined to that of said first-mentioned reel member, the bar members of said last-mentioned reel member being disposed alternately to those of said first-mentioned reel member.

6. A thread-advancing reel of cantilever form comprising a rigid, stationary frame member extending for a major portion of the length of the reel; a rigid reel member which is substantially circular in cross section embodying a plurality of circumferentially spaced, longitudinally extending bar members journalled on said frame member; and a second rigid reel member which is substantially circular in cross section and which embodies a plurality of circumferentially spaced, longitudinally extending bar members disposed alternately to those of said first-mentioned reel member, said second reel member being rotatably supported from at least one end of said frame member for rotation about an axis inclined to the axis of rotation of said first-mentioned reel member.

7. A thread-advancing reel comprising two interdigitating sets of longitudinally extending bar members, each of which sets is substantially circular in cross section; a frame member rotatably supporting one of said sets of bar members; a member rotatably supporting the other set of bar members; and means adjustably connecting said supporting member and said frame member whereby the axis about which the set of bar members carried by said supporting member rotates may be moved in a plane to a variety of positions in which said axis is inclined with respect to the axis of rotation of the other set.

8. A thread-advancing reel comprising two interdigitating sets of longitudinally extending bar members, each of which sets is substantially circular in cross section; a frame member rotatably supporting one of said sets of bar members; a member rotatably supporting the other set of bar members; and means adjustably connecting said supporting member and said frame member whereby the axis about which the set of bar members carried by said supporting member rotates may be moved in a plane offset from and parallel to the axis of rotation of the other set of bar members to a variety of positions in which said axis is inclined with respect to the axis of rotation of said other set.

9. A thread-advancing reel comprising two interdigitating sets of longitudinally extending bar members, each of which sets is substantially circular in cross section; a frame member rotatably supporting one of said sets of bar members; a member rotatably supporting the other set of bar members; and means adjustably connecting said supporting member and said frame member whereby the axis about which the set of bar members carried by said supporting member rotates may be moved about a fixed axis normal to and intersecting the axis of rotation of the other set of bar members to a variety of positions in which said axis is inclined with respect to the axis of rotation of said other set.

10. A thread-advancing reel comprising two interdigitating sets of longitudinally extending bar members, each of which sets is substantially circular in cross section; a frame member supporting one of said sets of bar members for rotation about a fixed axis; a sleeve surrounding said frame member and having journalled thereon the other set of bar members for rotation as a whole about an axis fixed with respect to said sleeve; and means adjustably associating said sleeve with said frame member providing movement of said sleeve such that said axis may move in a plane to a variety of positions in which it is inclined with respect to that of said other set of bar members.

11. A thread-advancing reel comprising two interdigitating sets of longitudinally extending bar members, each of which sets is substantially circular in cross section; a frame member; a shaft journalled in said frame member on which one of said sets of bar members is mounted; a sleeve surrounding said shaft and having journalled thereon the other set of bar members for rotation as a whole about an axis fixed with respect to said sleeve; and means adjustably mounting said sleeve on said frame member providing movement of said sleeve such that said axis may move in a plane to a variety of positions in which it is inclined with respect to that of said other set of bar members.

FRED J. SAMERDYKE.